Dec. 1, 1953  C. R. BLAKESLEE  2,660,993
HARPOON GUN
Filed Sept. 9, 1950  2 Sheets-Sheet 1
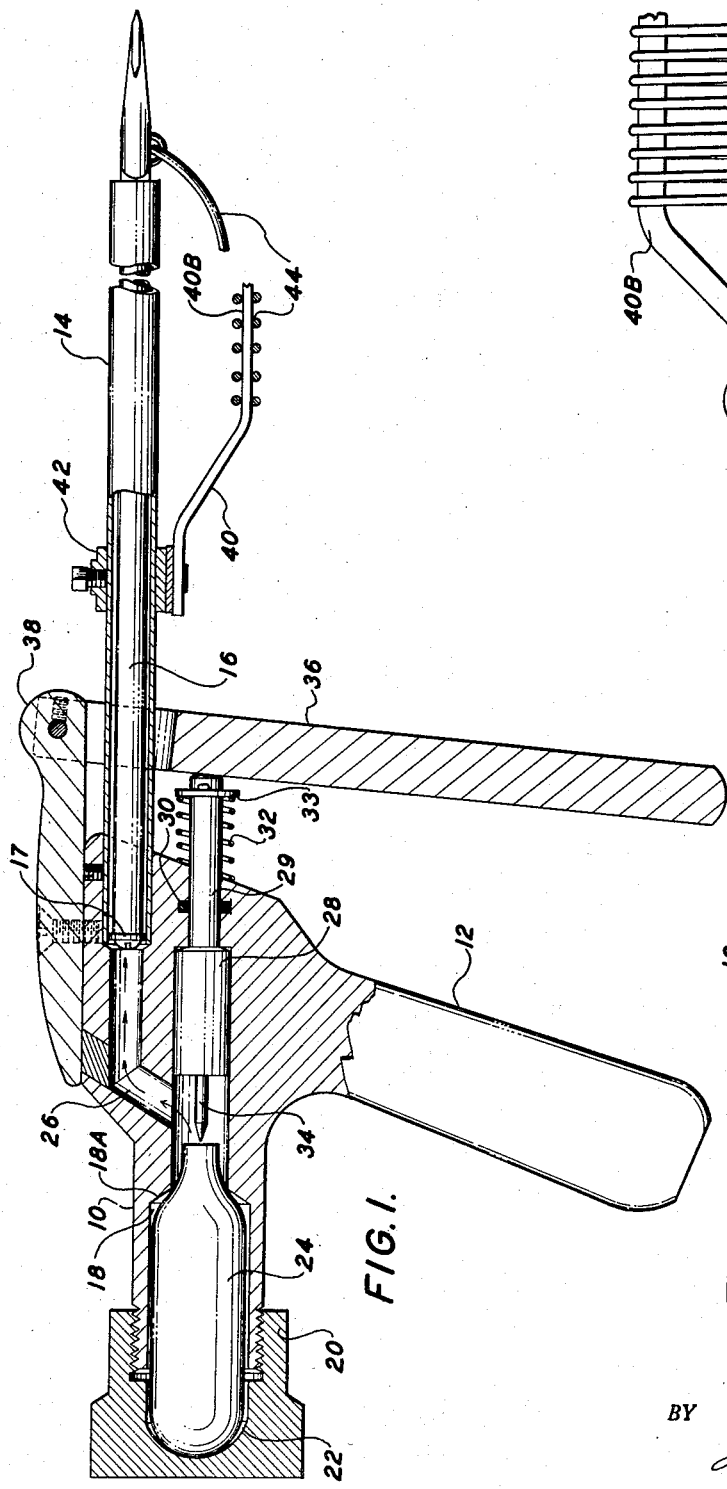
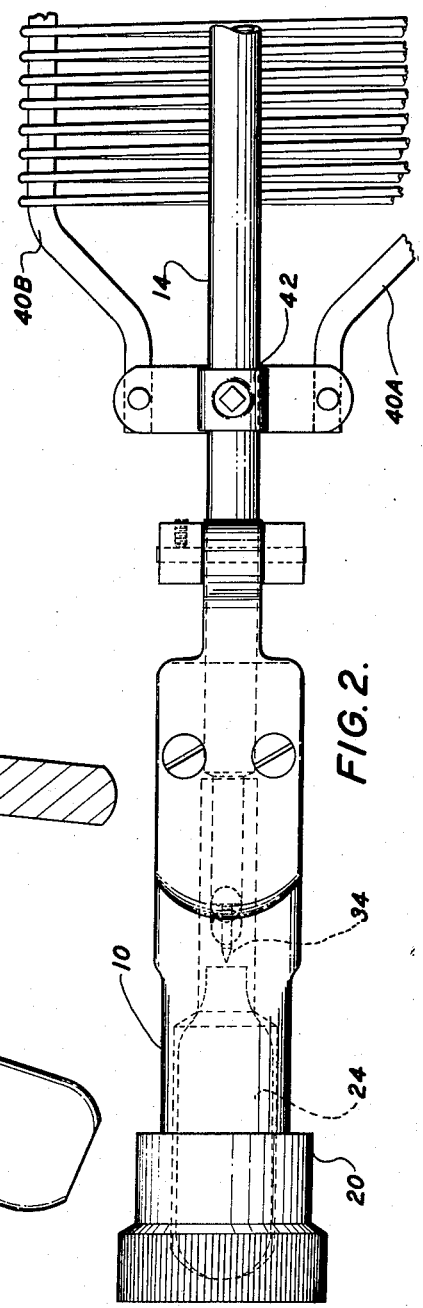
INVENTOR.
CHARLES R. BLAKESLEE
BY
*James B. Christie*
ATTORNEY Dec. 1, 1953   C. R. BLAKESLEE   2,660,993
HARPOON GUN
Filed Sept. 9, 1950   2 Sheets-Sheet 2
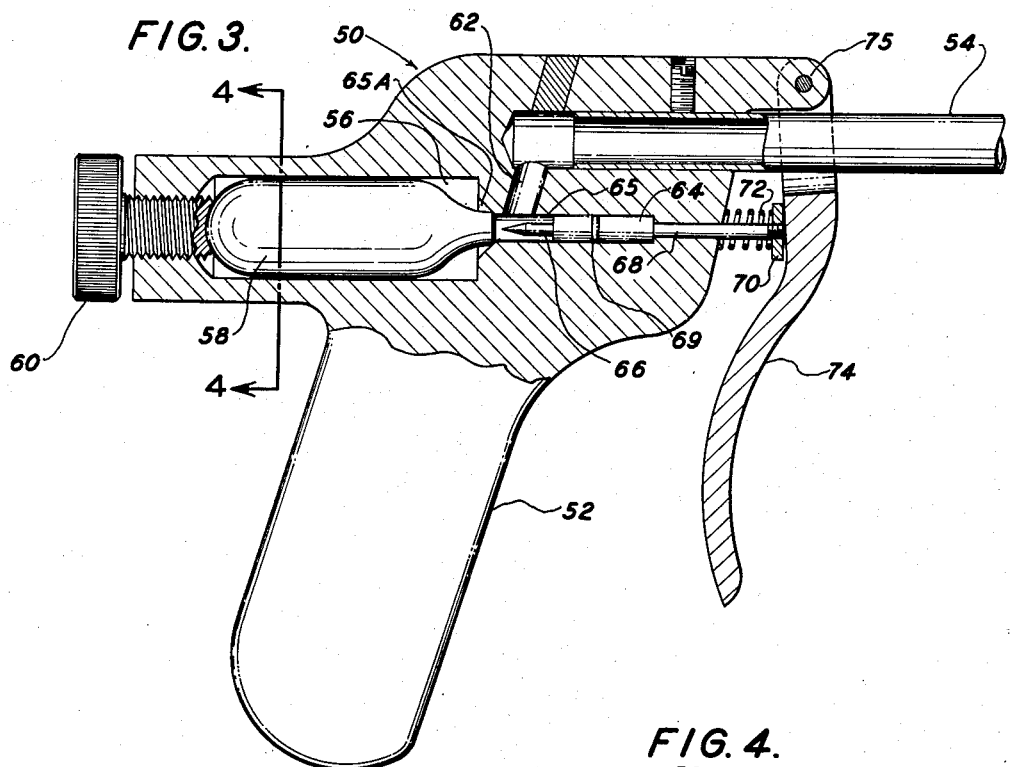
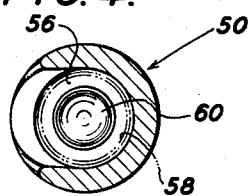
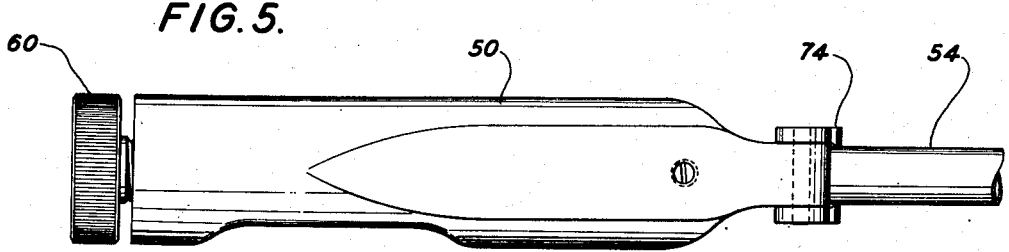
INVENTOR.
CHARLES R. BLAKESLEE
BY
James B. Christie
ATTORNEY Patented Dec. 1, 1953

2,660,993

UNITED STATES PATENT OFFICE 2,660,993

HARPOON GUN

Charles R. Blakeslee, Hollydale, Calif.

Application September 9, 1950, Serial No. 184,097

12 Claims. (Cl. 124—11)

This invention is directed to an improved harpoon particularly adapted to use in underwater sport fishing.

The sport of underwater fishing is becoming increasingly popular. It appears that a fish normally very leery of any activity above the water is quite unconcerned about an underwater swimmer who may aproach to within a matter of a few feet of his prey. In this type of fishing a harpoon or spear is used which is usually thrown manually or propelled by means of a sling. Either of these methods is limited in its accuracy and range and each has the additional disadvantage of requiring considerable exertion thereby placing a limitation on the underwater endurance of the fisherman.

I have now developed a lightweight harpoon gun admirably suited for underwater fishing and having a range and accuracy which represents a considerable improvement over the presently conventional harpoon propulsion methods described above. In the gun of the invention a harpoon is propelled by release of a pressurized gas, the gas release being controlled by a trigger action somewhat similar to that of a conventional gun. With a small capsule or cylinder of say carbon dioxide, such cylinders being available commercially, the gun will propel a 31 inch harpoon twenty feet or more under water and seventy-five yards or more in air with substantially no recoil. Particularly under water, a harpoon may be propelled with my gun for a greater distance and with better accuracy than is possible either by throwing the harpoon or with the aid of a sling.

In one aspect my invention contemplates a harpoon gun comprising an elongated tubular barrel open at one end to receive a harpoon, an enlarged chamber opening into the barrel adjacent its opposite end and adapted to house a cylinder of pressurized gas, a stylet or needle operable from the exterior of the gun to puncture the cylinder whereby pressurized gas flows from the chamber into the barrel forcibly expelling the harpoon therefrom.

Conventional practice in this type of fishing is to provide the harpoon with an elongated cord, the free end of which is grasped or otherwise controlled by the fisherman to give him some means of retrieving any fish that is impaled on the harpoon. Conveniently in the practice of my invention, a line or cord holder is mounted directly on the gun and is so constructed as to offer substantially no resistance to extension of the line as the harpoon is fired.

The invention will be more clearly understood by reference to the following detailed description taken in conjunction with the accompanying drawing in which:

Fig. 1 is a sectional elevation of one embodiment of the harpoon gun of the invention showing a harpoon inserted in the barrel thereof;

Fig. 2 is a top view of the gun of Fig. 1;

Fig. 3 is a sectional elevation of another and presently preferred embodiment of the invention;

Fig. 4 is a section taken on the line 4—4 of Fig. 3; and

Fig. 5 is a top view of the gun of Fig. 3.

Referring to Figs. 1 and 2 of the drawing, the gun comprises a body 10 having a handle or pistol grip 12 and an elongated tubular barrel 14 anchored at one end to the body and extending outwardly therefrom at more or less right angles to the angle of projection of the handle. The relationship of the body, handle and barrel is similar to that of a conventional pistol, the general arrangement facilitating handling and manipulation of the gun. A harpoon 16 is shown inserted in the barrel and is provided at its butt end with a gasket 17 which seals against the inner walls of the barrel.

The body 10 is provided with an open ended chamber 18 normally closed by a cap 20 and to which access may be had by removing the cap 20. Since the gun operates under a certain amount of pressure, the cap 20 is conveniently screwed on the end of the body and is of sufficient ruggedness to withstand any pressure to which the body is subjected. To conserve space the cap 20 is conveniently hollowed out as at 22 so that the cap and chamber 18 combine to provide a compartment of sufficient size to accommodate a cylinder 24 of pressurized gas. A passageway 26 communicates between the chamber 18 and the body end of the barrel 14. The passageway is of smaller diameter than the chamber so that an annular shoulder 18A is formed at the inner end of the chamber limiting the insertion and establishing the position of the gas cylinder 24. A plunger 28 is slidably mounted in the body and includes a shaft 29 sealed through a wall of the body as by a bushing 30 and extending exteriorly thereof. A coil spring 32 disposed around the shaft 29 between the body and a stop 33, mounted on the shaft exteriorly of the body, loads the shaft and plunger urging it to the retracted position shown in the drawing. A needle or stylet 34 is mounted on the inner end of the plunger and extends toward the chamber 18.

A lever or trigger 36 is pivotally depended from an upper portion of the body 38, the upper end of the trigger 36 being in the nature of a yoke with the legs of the yoke passing upwardly around opposite sides of the barrel 14. The trigger 36 depends from the body in conveniently spaced relationship from the handle. With the handle grasped in his hand the fisherman may easily control the operation of the trigger.

A cord or line holder 40 in the shape of an enlarged fork having tines 40A, 40B is affixed to and suspended from the gun barrel 14 by clamp 42 with the tines 40A, 40B extending outwardly towards the outer end of the barrel. A cord 44 having one end affixed to the harpoon is wrapped on the holder 40 encircling the tines 40A, 40B and with its inner end fastened or anchored to the holder.

The operation of the gun as described, is as follows. To load the gun the cap 20 is removed and a gas cylinder 24 is inserted in the position shown and the cap is replaced. The harpoon is inserted in the gun barrel with the gasketed butt end extending substantially to the inner end of the barrel, the harpoon shaft being somewhat longer than the barrel. To shoot the gun the trigger is squeezed toward the handle 12. In this process the plunger 28 is forced inwardly against the tension of spring 32 and the stylet 34 pierces the gas cylinder 24. The pressurized gas in the cylinder immediately forces the stylet out of the hole it has pierced and discharges under pressure through the passageway 26 against the gasketed butt end of the harpoon. The harpoon is discharged in this manner under the pressure of the gas escaping from the cylinder 24. To reload the gun the cap is removed, a new cylinder is inserted and the harpoon is again positioned in the barrel.

Carbon dioxide is available in cylinders approximately three-fourths of an inch in diameter and an inch in length for which the gun is designed. Cylinders of this size can be conveniently carried on the person and the gun may be reloaded by a fisherman without surfacing. This practice is particularly acceptable where the underwater fisherman is provided with a source of oxygen making it unnecessary for him to surface except at long intervals.

The gun illustrated in Figs. 3 to 5 is side-loaded and in this respect differs from the end-loaded gun of Fig. 1. This modification comprises a body 50 having a handle or pistol grip 52 and an elongated tubular barrel 54 projecting from the body. As in the foregoing embodiment, the relationship of the body, grip and barrel is similar to that of a conventional pistol to facilitate manipulation of the gun. The barrel is shaped to receive a harpoon (not shown), as for example the harpoon 16 of Fig. 1.

A chamber 56 is provided in the body 50 opening through a side wall of the body so that a cylinder 58 of pressurized gas may be inserted and removed from the side of the body. A breech bolt 60 is threaded through the end of the body opposite the barrel and into the body chamber, the inner end of the bolt being preferably concave to conform to the shape of the cylinder 58. A bore 65 in the body extends axially from the inner end of the chamber, the bore being enlarged at 65A adjacent the chamber to receive the reduced diameter tip of cylinder 58. A plunger 64 is slidably mounted in the body in the bore 65, the plunger having a needle or stylet 66 projecting axially from its inner end and axially aligned with the cylinder 58 mounted in the chamber. The plunger is mounted or formed on the inner end of a shaft 68, the shaft being of smaller diameter than the plunger and extending exteriorly of the body through a reduced diameter section of the bore 65. The plunger is sealed in the body as by an O ring 69 which may, with equal facility, be positioned around the shaft 68. A washer 70 or other stop means is mounted on the outer end of shaft 68 and a coil spring 72 is disposed around the shaft between the body and stop, the spring being under compression to urge the stop 70 away from the body. A trigger 74 is pivoted to the body at 75 to rest against the outer face of the washer or stop 70. As in the previously described embodiment, the trigger 74 includes a yoke, the legs of which extend upwardly on opposite sides of the gun barrel and are pivoted to the body on the opposite side of the barrel from the shaft 68. A harpoon line holder (not shown) may be affixed to the gun if desired.

A passageway 62 in the body opens into bore 65 adjacent chamber 56 and communicates at its opposite end with the inner end of barrel 54. The passageway 62 gives access between the gas cylinder 58 and barrel 54 for gas flow therebetween when the cylinder is punctured.

The operation of the gun of Fig. 3 is the same as that of the gun of Fig. 1, except with respect to the method of loading. With the bolt 60 backed away from the body chamber 56, the cartridge 58 is inserted in the chamber through the side wall of the body. The bolt is then screwed inwardly to bear against the end of cartridge 58 forcing the tip of the cartridge into the enlarged section 65A of bore 65. In this manner a metal to metal seal is effectuated between the cartridge tip and the bore 65 to prevent loss of pressure through the chamber. With the cartridge thus inserted and with a harpoon mounted in the barrel, the gun is fired by manipulation of trigger 74 to release the pressurized gas into the barrel through passageway 62 by puncturing the tip of the cartridge. To reload, the breech bolt is backed out of the chamber allowing removal of the spent cartridge and insertion of a charged cartridge.

Many modifications can be made in the gun as shown with the principal feature being the application of small commercially available cylinders of pressurized gas and the easy actuatable means for discharging the gas in such a cylinder against the confined end of a harpoon. For example, the gun may be constructed with the gas cylinder inserted at the barrel end of the body in which case a small button type plunger may be incorporated at the presently capped end for releasing the gas from the cylinder. Additionally, any form of line holder may be used and in fact such a holder may be eliminated if the user of the gun prefers to otherwise handle the harpoon line.

I claim:

1. A harpoon gun comprising an elongated tubular barrel open at one end to receive a harpoon, a body, the opposite end of the barrel being inserted in and affixed to the body, a chamber in the body, an opening in the side wall of the body giving access to the chamber, the chamber being adapted to receive a cylinder of gas under pressure inserted therein through said opening, retractable breech mounted means for holding said gas cylinder within said chamber, a passageway communicating between the chamber and the body end of the barrel, a plunger sealed through the body and slidable therein axially with respect to said chamber, a trigger exteriorly mounted on said body and adapted to engage the outer end of said plunger and to displace it toward said chamber, and a needle affixed to the inner end of said plunger and extending axially therefrom toward the chamber.

2. A harpoon gun comprising an elongated tubular barrel open at one end to receive a harpoon, a body, the opposite end of said barrel being inserted in and affixed to said body, an elongated chamber in the body, an elongated opening through a side wall of the body giving access to a longitudinal side of said chamber, a passageway between an end of the chamber and the body end of the barrel, retractable breech mounted means for holding a cylinder of gas within said chamber and against the chamber opening of said passageway, a plunger slidably sealed through the body, a trigger exteriorly mounted on said body and adapted to engage the outer end of said plunger to displace it toward said chamber, and a needle affixed to the inner end of said plunger and extending axially toward the passage end of said chamber.

3. A harpoon gun comprising an elongated tubular barrel open at one end to receive a harpoon, a body affixed to the opposite end of the barrel, a pistol grip extending from the body, an enlarged chamber in the body opening through a side wall of the body and adapted to receive a cylinder of gas under pressure through said opening, retractable breech mounted means for holding a gas cylinder within the chamber, a passageway communicating between the end of the chamber opposite the retractable breech mounted means and the body end of the barrel, a stylet slidably mounted in the body axially with respect to the chamber, and means operable from the exterior of the body to displace the stylet so as to puncture the cylinder to release the pressurized gas into the passageway.

4. A harpoon gun comprising an elongated tubular barrel open at one end to receive a harpoon, a body, the opposite end of the barrel being inserted in and affixed to the body, an elongated chamber in the body displaced axially with respect to the barrel, an elongated opening through a side wall of the body giving access to a longitudinal side of the chamber, a passageway between an end of the chamber and the body end of the barrel, retractable breech mounted means for holding a cylinder of gas within the chamber and for forcing the cylinder of gas against the chamber opening of the passageway, a spring loaded plunger slidably sealed through the body on the opposite side of the chamber from said retractable breech mounted means, a lever pivotally mounted to the body and adapted to engage the outer end of the plunger and displace it toward the chamber, and a needle affixed on the inner end of the plunger and extending axially therefrom toward the chamber.

5. In a harpoon gun, the combination which comprises a tubular barrel for holding a harpoon to be propelled, a container rigidly affixed to the barrel forming a chamber for holding a pressurized gas-filled cartridge, a conduit connecting one end of the chamber to the barrel, a stylet disposed in the container in proximity to the end of the chamber opening into the conduit and movable with respect to the cartridge and the container, for puncturing the cartridge and thereby releasing the propellant gas, and means projecting outside the container for moving the stylet.

6. A harpoon gun comprising an elongated tubular barrel open at one end to receive a harpoon, a body affixed to the opposite end of the barrel forming a chamber, the chamber having an opening through an end wall of the body to receive a cartridge of pressurized gas, a closure means for closing the chamber opening and adapted to confine a gas-filled cartridge in the chamber, a conduit connecting one end of the chamber to the barrel, a plunger slidably sealed through the body adjacent the end of the chamber which opens into the conduit, a trigger exteriorly mounted on the body and adapted to engage the outer end of the plunger and to displace it toward the chamber, and a needle affixed to the inner end of the plunger extending axially therefrom toward the cartridge.

7. A harpoon gun comprising an elongated tubular barrel open at one end to receive a harpoon, a body rigidly affixed to the opposite end of the barrel, hand grip means extending from the body, the body forming a chamber, the chamber having an opening through an end wall of the body to receive a cartridge of pressurized gas, a closure means for closing the chamber opening and adapted to confine a gas-filled cartridge in the chamber, a conduit connecting one end of the chamber to the barrel, a plunger slidably sealed through the body adjacent the end of the chamber which opens into the conduit, a trigger exteriorly mounted on the body and adapted to engage the outer end of the plunger and displace it toward the chamber, and a needle affixed to the inner end of the plunger extending axially therefrom toward the cartridge.

8. A harpoon gun comprising an elongated tubular barrel open at one end to receive a harpoon, a body rigidly affixed to the opposite end of the barrel forming a chamber, the chamber having an opening through an end wall of the body to receive a cartridge of pressurized gas, a closure means for closing the chamber and adapted to confine a gas-filled cartridge in the chamber, a conduit connecting one end of the chamber to the barrel, a plunger slidably sealed through the body adjacent the end of the chamber which opens into the conduit, a lever pivotally mounted to the body and adapted to engage the outer end of the plunger and to displace it toward the chamber, and a needle affixed to the inner end of the plunger extending axially toward the cartridge.

9. A harpoon gun comprising an elongated tubular barrel open at one end to receive a harpoon, a body rigidly affixed to the opposite end of the barrel forming a chamber, the chamber having an opening through an end wall of the body adapted to receive a cartridge of pressurized gas, a closure means for closing the chamber and adapted to confine a gas-filled cartridge in the chamber, a conduit connecting one end of the chamber to the barrel, a plunger slidably sealed through the body adjacent the end of the chamber which opens into the conduit, a lever pivotally mounted to the body and adapted to engage the outer end of the plunger and to displace it toward the chamber, and a needle affixed to the inner end of the plunger extending axially toward the cartridge, and a line holder mounted to and depending from the barrel.

10. Apparatus according to claim 9 wherein the harpoon line holder comprises a two tined fork mounted to the barrel with the fork tines extending in the direction of the open end of the barrel and parallel to the barrel.

11. In a harpoon gun, the combination which comprises a tubular barrel for holding a harpoon to be propelled, a container rigidly affixed to the barrel forming a chamber for holding a pressurized gas-filled cartridge, the chamber having an opening through a side wall of the body, retractable breech mounted means for holding the cartridge in the chamber, a conduit connecting one end of the chamber to the barrel, a stylet disposed in the container in proximity to the end of the chamber opening into the conduit movable with respect to the cartridge and to the container for puncturing the cartridge and thereby releasing the propellant gas, and means projecting outside the container for moving the stylet.

12. A harpoon gun comprising an elongated tubular barrel open at one end to receive a harpoon, a container rigidly affixed to the barrel and forming a chamber for holding a pressurized gas-filled cartridge, a conduit connecting one end of the chamber to the barrel, the chamber having an opening through a side wall of the body to receive the cartridge, means mounted adjacent the end of the chamber opposite the barrel for holding the cartridge within the chamber, and means located between the chamber and the barrel, movable with respect to the cartridge and operable from the exterior of the gun to release pressurized gas from the cylinder into the barrel.

CHARLES R. BLAKESLEE.

References Cited in the file of this patent
UNITED STATES PATENTS

| Number | Name | Date |
|---|---|---|
| 1,880,354 | Mueller | Oct. 4, 1932 |
| 2,090,731 | Klein | Aug. 24, 1937 |
| 2,249,608 | Greene | July 15, 1941 |
| 2,375,314 | Mills | May 8, 1945 |
| 2,504,525 | Holderness | Apr. 18, 1950 |